US012775685B2

(12) United States Patent
Albero et al.

(10) Patent No.: US 12,775,685 B2
(45) Date of Patent: Oct. 27, 2026

(54) SYSTEM FOR SECURE CROSS PARTITION ACCESS AND COMPUTING DEVICE RECOVERY

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 292 days.

(21) Appl. No.: 18/222,021

(22) Filed: Jul. 14, 2023

(65) Prior Publication Data

US 2025/0021632 A1 Jan. 16, 2025

(51) Int. Cl.
*G06F 21/31* (2013.01)
*G06F 21/60* (2013.01)

(52) U.S. Cl.
CPC ............ *G06F 21/31* (2013.01); *G06F 21/602* (2013.01)

(58) Field of Classification Search
CPC . G06F 21/31; G06F 21/602; G06F 2221/2131
USPC ........................................................... 726/17
See application file for complete search history.

(56) References Cited

U.S. PATENT DOCUMENTS

| | | | |
|---|---|---|---|
| 8,180,735 | B2 | 5/2012 | Ansari |
| 8,316,237 | B1 | 11/2012 | Felsher |
| 8,468,244 | B2 | 6/2013 | Redlich |
| 8,613,070 | B1 | 12/2013 | Borzycki |
| 9,191,380 | B2 | 11/2015 | Anderson |
| 10,362,111 | B2 | 7/2019 | Resch |
| 10,511,442 | B2 | 12/2019 | Rogers |
| 10,817,392 | B1 | 10/2020 | McAuliffe |
| 11,126,635 | B2 | 9/2021 | Behzadi |
| 11,327,949 | B2 | 5/2022 | Maccanti |
| 11,366,723 | B2 | 6/2022 | Bansod |
| 11,436,202 | B2 | 9/2022 | Dornemann |
| 11,455,409 | B2 | 9/2022 | Fisher |
| 2006/0155988 | A1 * | 7/2006 | Hunter .................. G06F 21/575 713/164 |

(Continued)

FOREIGN PATENT DOCUMENTS

WO WO-2022223136 A1 * 10/2022 ............. H04L 9/085

*Primary Examiner* — Jacob Lipman
(74) *Attorney, Agent, or Firm* — Moore & Van Allen PLLC; Nicholas C. Russell

(57) ABSTRACT

A system is provided for secure cross partition access and computing device recovery. In particular, the system may comprise a computing device that includes a non-transitory memory or storage device comprising one or more partitions. A user may attempt to log into the device and get locked out of the primary partition of the device after a threshold number of unsuccessful login attempts. The additional partitions of the computing device may store a portion of the authentication credential needed to access the primary partition and prompt the user using an item from the user data stored in a user-specific database. Upon detecting that the user has successfully accessed a threshold number of partitions and/or successfully provided responses to the prompts from a threshold number of partitions, the system may unlock and grant access to the locked partitions.

14 Claims, 5 Drawing Sheets

(56) References Cited

U.S. PATENT DOCUMENTS

| | | | | |
|---|---|---|---|---|
| 2012/0257759 | A1* | 10/2012 | Nick | G06F 21/6209 380/286 |
| 2017/0346851 | A1 | 11/2017 | Drake | |
| 2018/0143880 | A1 | 5/2018 | Dornemann | |
| 2018/0322017 | A1 | 11/2018 | Maccanti | |
| 2018/0357412 | A1* | 12/2018 | Mehta | H04L 9/0897 |
| 2019/0042407 | A1 | 2/2019 | Gao | |
| 2019/0251279 | A1 | 8/2019 | Emberson | |
| 2019/0268150 | A1* | 8/2019 | Kariv | G06F 21/6218 |
| 2020/0151338 | A1 | 5/2020 | Silverstone | |
| 2021/0064476 | A1 | 3/2021 | Maccanti | |
| 2021/0218722 | A1 | 7/2021 | Gaylor | |
| 2021/0311841 | A1 | 10/2021 | McNutt | |
| 2021/0367778 | A1* | 11/2021 | Hamel | G06F 16/27 |

* cited by examiner

SYSTEM FOR SECURE CROSS PARTITION ACCESS AND COMPUTING DEVICE RECOVERY

TECHNOLOGICAL FIELD

Example embodiments of the present disclosure relate to a system for secure cross partition access and computing device recovery.

BACKGROUND

There is a need for a way to securely restore access to computing devices.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for secure cross partition access and computing device recovery. In particular, the system may comprise a computing device that includes a non-transitory memory or storage device comprising one or more partitions. A user may attempt to log into the device and get locked out of the primary partition of the device after a threshold number of unsuccessful login attempts. As part of the computing device access and recovery process, the system may gather and maintain a database of user data containing specific items of information regarding the user. The additional partitions of the computing device may store a portion of the authentication credential needed to access the primary partition and prompt the user using an item from the user data stored in the user-specific database. Upon detecting that the user has successfully accessed a threshold number of partitions and/or successfully provided responses to the prompts from a threshold number of partitions, the system may unlock and grant access to the locked partitions. In this way, the system may provide a secure way to perform recovery of locked computing devices.

Accordingly, embodiments of the present disclosure provide a system for secure cross partition access and computing device recovery, the system comprising a processing device; a non-transitory storage device containing instructions when executed by the processing device, causes the processing device to perform the steps of detecting an unsuccessful attempt by a user to access a primary partition of a computing device, wherein the computing device comprises one or more ancillary partitions; receiving a request from the user to initiate a recovery process for the computing device; based on receiving the request, presenting to the user a first prompt stored on a first ancillary partition of the one or more ancillary partitions, wherein a first portion of an authentication credential is stored on the first ancillary partition; based on receiving a response to the first prompt, presenting to the user a second prompt stored on a second ancillary partition of the one or more ancillary partitions, wherein a second portion of the authentication credential is stored on the second ancillary partition; and authenticating the user based on the response to the first prompt and a response to the second prompt, wherein authenticating the user comprises generating a reconstituted authentication credential based on the first portion and the second portion; and unlocking the primary partition using the reconstituted authentication credential.

In some embodiments, the first portion of the authentication credential is stored on the first ancillary partition in encrypted form, wherein generating the reconstituted authentication credential comprises unlocking the first ancillary partition and decrypting the first portion of the authentication credential using a first decryption key.

In some embodiments, the second portion of the authentication credential is stored on the second ancillary partition in encrypted form, wherein generating the reconstituted authentication credential further comprises unlocking the second ancillary partition and decrypting the second portion of the authentication credential using a second decryption key that is different from the first decryption key.

In some embodiments, the first portion of the authentication credential is encrypted using a different encryption algorithm from the second portion of the authentication credential.

In some embodiments, the first prompt and the second prompt are selected from one or more prompts generated from a user knowledge database, wherein the user knowledge database comprises information regarding the user.

In some embodiments, the prompts are generated using a natural language generation ("NLG") algorithm based on the information regarding the user.

In some embodiments, the authentication credential comprises a username and password.

Embodiments of the present disclosure also provide a computer program product for secure cross partition access and computing device recovery, the computer program product comprising a non-transitory computer-readable medium comprising code causing an apparatus to perform the steps of detecting an unsuccessful attempt by a user to access a primary partition of a computing device, wherein the computing device comprises one or more ancillary partitions; receiving a request from the user to initiate a recovery process for the computing device; based on receiving the request, presenting to the user a first prompt stored on a first ancillary partition of the one or more ancillary partitions, wherein a first portion of an authentication credential is stored on the first ancillary partition; based on receiving a response to the first prompt, presenting to the user a second prompt stored on a second ancillary partition of the one or more ancillary partitions, wherein a second portion of the authentication credential is stored on the second ancillary partition; and authenticating the user based on the response to the first prompt and a response to the second prompt, wherein authenticating the user comprises generating a reconstituted authentication credential based on the first portion and the second portion; and unlocking the primary partition using the reconstituted authentication credential.

In some embodiments, the first portion of the authentication credential is stored on the first ancillary partition in encrypted form, wherein generating the reconstituted authentication credential comprises unlocking the first ancillary partition and decrypting the first portion of the authentication credential using a first decryption key.

In some embodiments, the second portion of the authentication credential is stored on the second ancillary partition in encrypted form, wherein generating the reconstituted authentication credential further comprises unlocking the second ancillary partition and decrypting the second portion of the authentication credential using a second decryption key that is different from the first decryption key.

In some embodiments, the first portion of the authentication credential is encrypted using a different encryption algorithm from the second portion of the authentication credential.

In some embodiments, the first prompt and the second prompt are selected from one or more prompts generated from a user knowledge database, wherein the user knowledge database comprises information regarding the user.

In some embodiments, the prompts are generated using a natural language generation ("NLG") algorithm based on the information regarding the user.

Embodiments of the present disclosure also provide a computer-implemented method for secure cross partition access and computing device recovery, the computer-implemented method comprising detecting an unsuccessful attempt by a user to access a primary partition of a computing device, wherein the computing device comprises one or more ancillary partitions; receiving a request from the user to initiate a recovery process for the computing device; based on receiving the request, presenting to the user a first prompt stored on a first ancillary partition of the one or more ancillary partitions, wherein a first portion of an authentication credential is stored on the first ancillary partition; based on receiving a response to the first prompt, presenting to the user a second prompt stored on a second ancillary partition of the one or more ancillary partitions, wherein a second portion of the authentication credential is stored on the second ancillary partition; and authenticating the user based on the response to the first prompt and a response to the second prompt, wherein authenticating the user comprises generating a reconstituted authentication credential based on the first portion and the second portion; and unlocking the primary partition using the reconstituted authentication credential.

In some embodiments, the first portion of the authentication credential is stored on the first ancillary partition in encrypted form, wherein generating the reconstituted authentication credential comprises unlocking the first ancillary partition and decrypting the first portion of the authentication credential using a first decryption key.

In some embodiments, the second portion of the authentication credential is stored on the second ancillary partition in encrypted form, wherein generating the reconstituted authentication credential further comprises unlocking the second ancillary partition and decrypting the second portion of the authentication credential using a second decryption key that is different from the first decryption key.

In some embodiments, the first portion of the authentication credential is encrypted using a different encryption algorithm from the second portion of the authentication credential.

In some embodiments, the first prompt and the second prompt are selected from one or more prompts generated from a user knowledge database, wherein the user knowledge database comprises information regarding the user.

In some embodiments, the prompts are generated using a natural language generation ("NLG") algorithm based on the information regarding the user.

In some embodiments, the authentication credential comprises a username and password.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
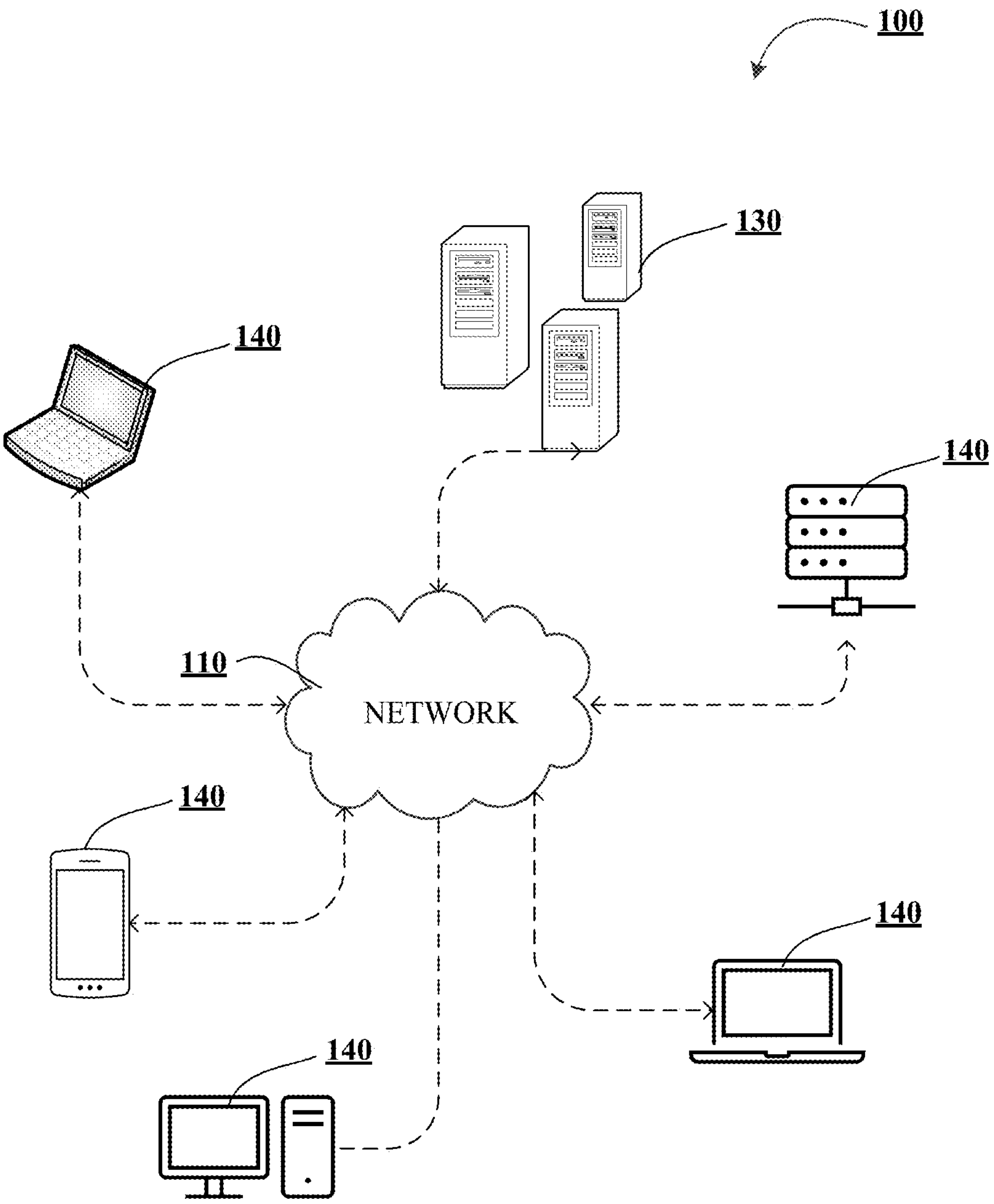
Figure 1B:
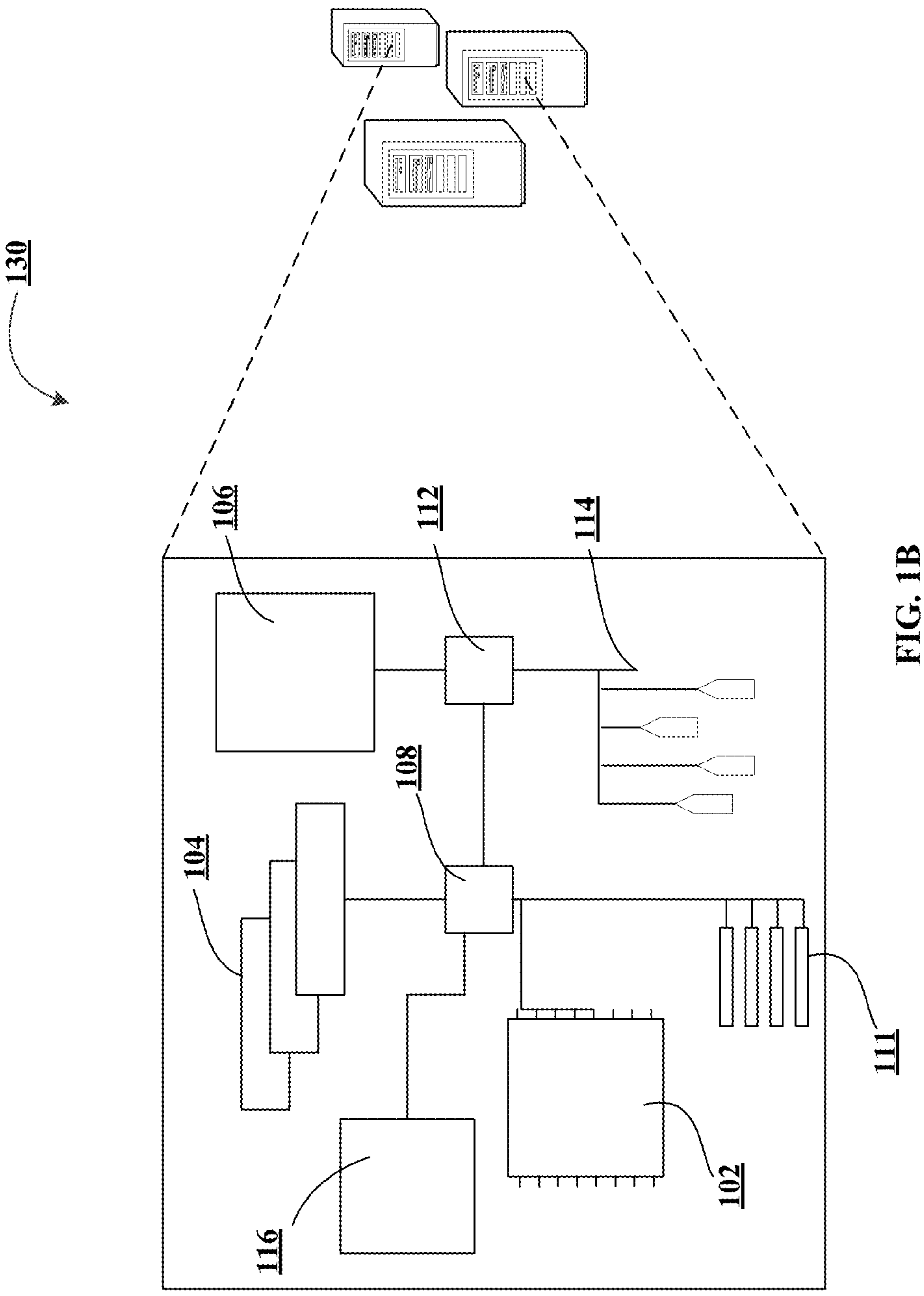
Figure 1C:
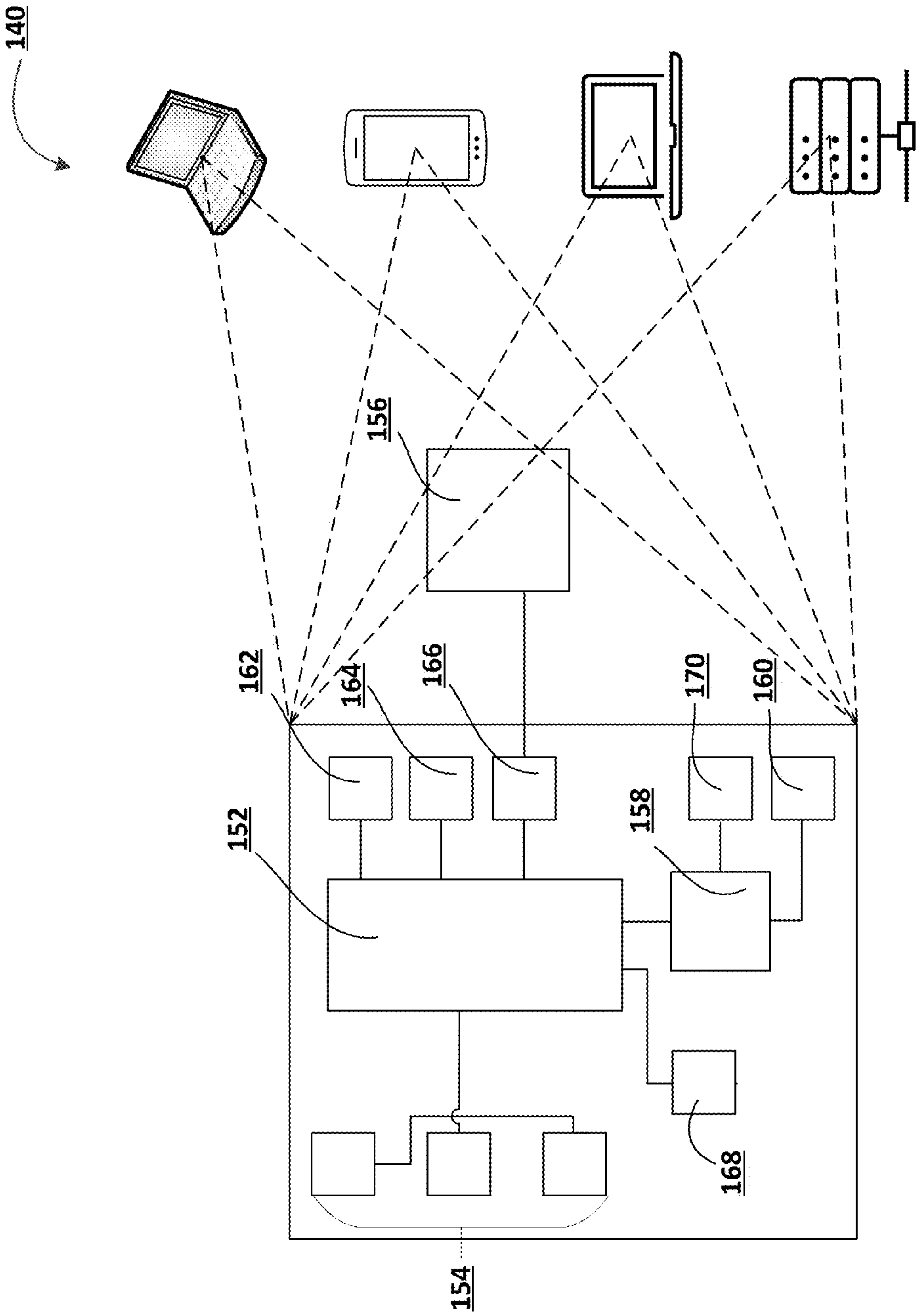
Figure 2:
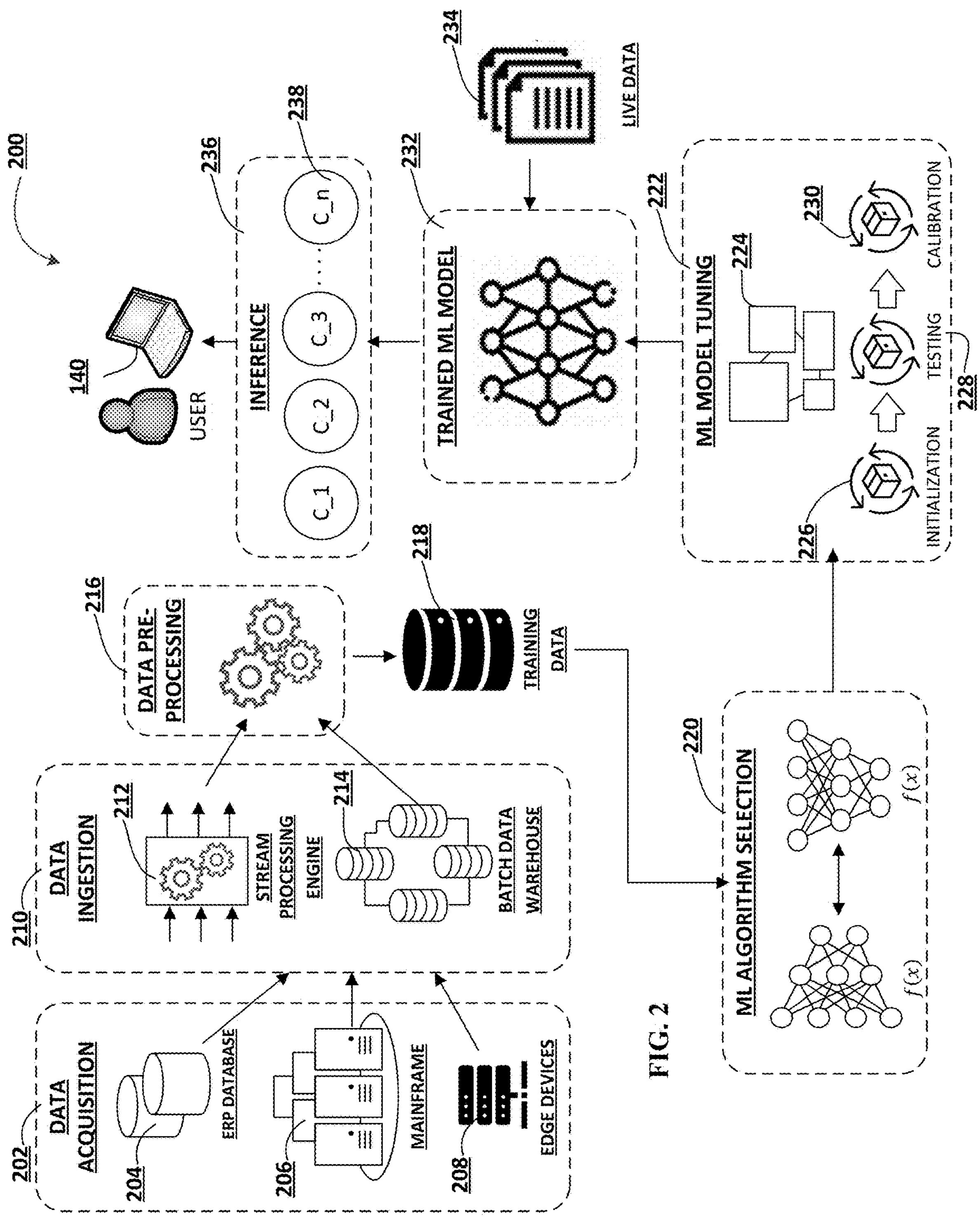
Figure 3:
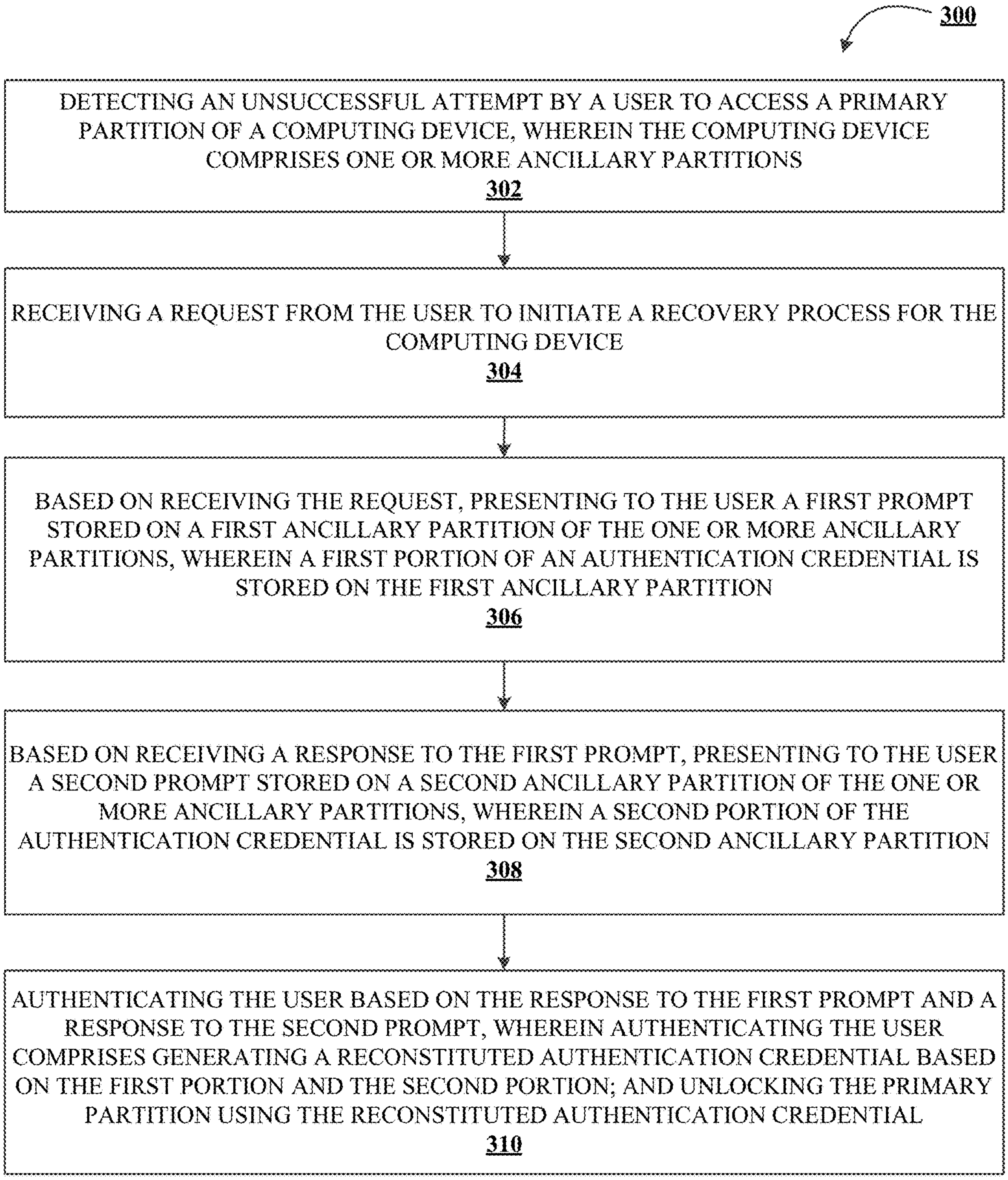

FIGS. 1A-1C illustrates technical components of an exemplary distributed computing for secure cross partition access and computing device recovery, in accordance with an embodiment of the disclosure;

FIG. 2 illustrates an exemplary machine learning ("ML") subsystem architecture, in accordance with an embodiment of the disclosure; and FIG. 3 illustrates a method for secure cross partition access and computing device recovery, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like. In yet other embodiments, the resources may include real-world goods or commodities that may be acquired and/or exchanged by a user.

As a security measure, a computing device may require that a user provide authentication credentials (e.g., a username and/or password, PIN, unique characteristic data, and/or the like) to gain authorized access to the computing device as well as the contents and functions found therein. That said, various factors or conditions may cause the user's authentication attempt to fail. For instance, the user may fail to remember the username and/or password, PIN, and/or the like that may be required to access the computing device, the computing device may fail to recognize the user's unique characteristic data (e.g., a fingerprint scan), and/or the like. Furthermore, the computing device may be configured to execute various security measures in response to repeated failed authentication attempts, such as locking at least a portion of the computing device from being accessed, rejecting further authentication attempts for a cooldown period (e.g., 1 hour), encrypting the data on the computing device, and in some cases, resetting the device to factory settings and/or performing a secure wipe of the computing device. In this way, the security measures of the computing device may at times hinder the ability of legitimate, authorized users from accessing the computing device. Accordingly, there is a need for a secure way to provide intelligent recovery of access to computing devices.

To address the above concerns among others, the system described herein provides a way to grant secure user access to computing devices. In this regard, the computing device may comprise one or more storage partitions (e.g., physical or logical partitions of a non-transitory storage medium such as a hard disk, storage card, memory card, solid state drive, and/or the like), where the one or more storage partitions may comprise a first partition (e.g., a primary partition) and a second partition (e.g., a secondary or ancillary partition). It should be understood that in some embodiments, the one or more storage partitions may comprise any number of partitions, such as three partitions (e.g., one primary partition and two ancillary partitions), four partitions (e.g., one primary partition and three ancillary partitions), ten partitions (e.g., one primary partition and nine ancillary partitions), and/or the like.

In the scenario in which the user is unable to access the primary partition (e.g., the partition that may contain the various data, applications, and/or functions that the user wishes to access), the user may attempt to recover the authentication credential and/or access to the primary partition by accessing the ancillary partitions (e.g., in response to receiving a prompt from the computing device asking whether the user would like to attempt recovery from the other partitions). In this regard, the ancillary partitions may each store a portion of the authentication credential required to access the primary partition. For instance, in embodiments in which the authentication credential is a seven character string such as a password, each of the ancillary partitions may store a portion of the password (e.g., a first ancillary partition may store the characters in positions 1, 5, and 6 of the password, a second ancillary partition may store the characters in positions 2 and 4 of the password, and a third ancillary partition may store the characters in positions 3 and 7 of the password) such that the user must access the requisite number of ancillary partitions (e.g., the first, second, and third ancillary partitions) in order to reconstitute the password. If the authentication credential is unique characteristic data (e.g., a fingerprint scan), the authentication credential may comprise a portion of the fingerprint scan data such that when the fingerprint scan data is reconstituted or reformed, the reformed data may be used to authenticate the user with the computing device.

In some embodiments, a level of redundancy may be implemented across the partitions such that the same portions of the authentication credentials are stored across multiple ancillary partitions. Continuing the above example, a fourth ancillary partition may store the characters in positions 1 and 6 of the password, and a fifth ancillary partition may store the characters in positions 5 and 7 of the password. In this way, so long as the user is able to access the requisite or threshold partitions to reconstitute the password, the computing device may grant authorized access to the user. Accordingly, in some embodiments, the system may require that the user unlock a threshold number of ancillary partitions before the computing device is unlocked, where the threshold number may be determined based on the degree of sensitivity of the computing device and/or the contents stored thereon. For instance, for computing devices storing particularly sensitive data, the system may set a higher threshold for the number of ancillary partitions that must be successfully unlocked before the primary partition is unlocked.

In order to access the ancillary partitions, the computing device may display a prompt to the user and require the user to provide a response or input with respect to the prompt. The prompt may be, for instance, a hint, question, cue, and/or the like that may be based on information within the user's knowledge. In this regard, the system may comprise a user knowledge database that comprises various types of information regarding the user that is tracked and/or saved by the system subject to user consent, such as user biographical information, address or location information, user activity information (e.g., internet browsing history, transaction history, user-published information, and/or the like), user provided information, and/or the like. The information regarding the user may be continuously collected by the system over various channels (e.g., user interactions with the system, publicly available information, and/or the like).

In some embodiments, the prompts may be generated using an artificial intelligence based machine learning model that may use natural language processing ("NLP") and/or natural language generation ("NLG") processes to read the information regarding the user and automatically generate the prompts to be used for each of the ancillary partitions. In this way, the system may be able to generate novel prompts for the large knowledge base of information regarding the user on a real-time, ongoing basis to ensure that the prompts always reflect the latest available information regarding the user. Accordingly, the system may reduce the incidence of the user failing to provide the correct response to a prompt to unlock any given ancillary partition. The prompt may take one or more of various forms, such as a text-based cue, audio-based cue, image or video based cue, and/or the like. In other embodiments, the prompt may be a request to provide alternative authentication credentials. For instance, if the primary authentication credential is a password, the alternative authentication credential may be a fingerprint scan, iris scan, facial scan, and/or the like. In some embodiments, the prompts for one or more of the ancillary partitions may be dynamically reconfigured such that the prompts may be randomized or different each time the ancillary partition is accessed.

Accordingly, in an exemplary embodiment, upon detecting that the user is accessing the first ancillary partition on the computing device, the computing device may provide a text-based prompt (e.g., "What is the name of your pet dog?"). If the user provides a correct response to the prompt (e.g., "Spot"), the computing device may unlock the portion of the authentication credential stored within the first ancillary partition (e.g., by decrypting the encrypted portion of the authentication credential within the first ancillary partition). Subsequently, upon detecting that the user is accessing the second ancillary partition on the computing device, the computing device may provide an audio-based prompt (e.g., "Which of the following locations have you visited in the past week?"). If the user provides the correct response to the prompt for the second ancillary partition, the system may unlock the portion of the authentication credential stored within the second ancillary partition. The user may continue to unlock the requisite ancillary partitions until the entire authentication credential has been reformed from the various portions of the authentication credential stored across the ancillary partitions. It should be understood that the foregoing embodiment is provided for illustrative purposes and is not intended to restrict the scope of the disclosure provided herein.

Once the authentication credentials have been reconstituted, the reformed authentication credentials may be used to unlock the computing device (e.g., by unlocking the primary partition), thereby granting the user with authorized access to the computing device. For instance, in some embodiments (e.g., in which the authentication credential is a password), the action of unlocking each of the ancillary partitions may cause an input field of a graphical interface display of the computing device to be populated by the various portions of the authentication credential obtained by unlocking the ancillary partitions. In this regard, in some embodiments, the computing device may require not only that specific ancillary partitions are unlocked by the user, but may further require that the ancillary partitions are unlocked in a particular sequence (e.g., a sequence such as the second ancillary partition, then the fourth ancillary partition, then the first ancillary partition, or the like). Accordingly, the user may begin the access recovery process by attempting to first access the prompt for the second ancillary partition, where the prompts for the remaining ancillary partitions may be locked from being accessed by the user. Upon successfully providing the response to the prompt associated with the second ancillary partition, the portion of the authentication credential stored on the second ancillary partition may be decrypted, and the prompt for the next ancillary partition in the sequence (e.g., the fourth ancillary partition) may be accessed by the user. If the user continues to provide the correct responses to each of the prompts, the computing device may automatically select the correct sequence of ancillary partitions to unlock to allow the primary partition to be unlocked for user access.

In some embodiments, unlocking an alternate sequence of ancillary partitions may trigger one or more alternate functions that are different from the function to unlock the primary partition of the computing device. For instance, if the sequence to unlock the computing device comprises unlocking ancillary partitions 1, 5, 2, and 7 in order, an alternate sequence may be unlocking 1, 3, 4, and 7 in order. In one example, the alternate sequence may be triggered by the user to initiate a distress signal that may be sent to the computing systems of one or more entities (e.g., organizations with which the user has a preexisting relationship, government organizations, authorities, and/or the like). In such a scenario, the alternate sequence may be triggered by the user providing a designated, alternate response to a particular prompt that initiates the alternate sequence. Continuing the above example, if the prompt associated with the first ancillary partition is a text prompt (e.g., "What is the name of your pet dog?"), and the correct response is a first response (e.g., "Spot"), the user may provide a second response (e.g., "Buster") that may be designated by the system as the response that initiates the transmission of the distress signal. Accordingly, upon receiving the second response from the user, the system may, rather than providing the prompt for the next ancillary partition for unlocking the computing device (e.g., the prompt for ancillary partition 5), the system may provide the prompt for the next ancillary partition for initiating the alternate function (e.g., the prompt for ancillary partition 3).

In some embodiments, the system may initiate an intelligent primary partition backup process upon detecting that the security measures of the computing device may wipe the primary partition. For instance, the computing device may be configured to securely wipe the primary partition upon receiving multiple (e.g., 10) failed authentication attempts by the user. In such an embodiment, before the final failed authentication attempt that will cause the security measure to activate (e.g., after the 9th attempt), the computing device may automatically generate backup data of the primary partition, where the backup data includes at least a portion of the data stored on the primary partition. The backup data may be split and stored, in encrypted form, across at least a portion of the ancillary partitions of the computing device. In the event that the primary partition is wiped (e.g., the computing device executes the security measure in response to the tenth failed authentication attempt by the user), initiating the access recovery function by correctly responding to the prompts may initiate a data recovery process through which the backup data is reconstituted from the various ancillary partitions and subsequently restored onto the primary partition.

An exemplary embodiment is described below for illustrative purposes only and should not be construed as restricting the scope of the disclosure provided herein. In one embodiment, a user may attempt to access a primary partition on a desktop computer by entering a password associated with a user account. Upon detecting multiple failed authentication attempts from the user (e.g., the user cannot remember the password and is providing incorrect passwords), the system may display an option to the user to initiate the device recovery process through the ancillary partitions (e.g., by displaying a message such as "Do you wish to attempt device recovery?"). If the user response in the affirmative (e.g., by selecting an interface element on the graphical interface corresponding with an affirmative response), the system may present a prompt associated with a first ancillary partition to the user (e.g., "You used X credit card at which of these locations?"). Upon receiving a correct response to the prompt, the system may decrypt the portion of the password stored within the first ancillary partition. The system may then present a prompt associated with a second ancillary partition. The system may continue in the manner described until the user has provided a sufficient number of correct responses to the prompts associated with the ancillary partitions. Once the user has unlocked the required ancillary partitions, the system may unlock the primary partition and allow the user to access the computing device and the contents stored therein.

The system as described herein provides a number of technological benefits over conventional device recovery systems. In particular, by using multiple ancillary partitions to restore authorized access to the computing device, the system provides a convenient, yet secure way to prevent authorized users from getting locked out of their computing devices. Furthermore, by using AI-driven processes to generate the prompts, the system may ensure that the routes to recovering the device remain up to date with respect to the information associated with the user, which in turn may decrease the number of incorrect responses provided by the user to the prompts associated with the ancillary partitions.

FIGS. 1A-1C illustrate technical components of an exemplary distributed computing environment 100 for the system for secure cross partition access and computing device recovery. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for secure cross partition access and computing device recovery, in accordance with an embodiment of the disclosure. As shown in block 302, the method includes detecting an unsuccessful attempt by a user to access a primary partition of a computing device, wherein the computing device comprises one or more ancillary partitions. In one embodiment, a user may have forgotten a username and/or password and subsequently entered the wrong username and/or password one or more times into the computing device. In other embodiments, the user may have unsuccessfully attempted to provided unique characteristic data (e.g., a fingerprint scan). In an exemplary embodiment, the computing device may be a mobile phone of the user, where the primary partition of the mobile phone may comprise the data, applications, and/or functions that the user is attempting to access (e.g., user applications, phone contacts, messages, and/or the like). Accordingly, in some embodiments, upon detecting the unsuccessful attempt from the user, the system may be configured to prompt the user to indicate whether the user wishes to attempt a recovery process using the ancillary partitions of the computing device.

Next, as shown in block 304, the method includes receiving a request from the user to initiate a recovery process for the computing device. In some embodiments, the request from the user may be a response to the prompt to the user to initiate the recovery process using the ancillary partitions. In some embodiments, the recovery process may comprise the user unlocking a series of ancillary partitions of the computing device through a series of prompts or questions stored on each of the ancillary partitions within the series. In this regard, each of the ancillary partitions may store at least a portion of the authentication credential that may be used to unlock the computing device, where each portion of the authentication credential may be stored in encrypted form. Accordingly, upon detecting a correct response to a prompt, the encrypted portion of the authentication credential may be decrypted (e.g., using a decryption key). In some embodiments, multiple different decryption keys and/or encryption algorithms may be used for the ancillary partitions. For instance, a first ancillary partition may use a first encryption algorithm and/or a first decryption key, whereas a second ancillary partition may use a second encryption algorithm and/or a second decryption key. In this way, access to the remaining ancillary partitions (e.g., the second ancillary partition, the third ancillary partition, and/or the like) may be locked to the user until the user successfully unlocks the first ancillary partition.

Next, as shown in block 306, the method includes, based on receiving the request, presenting to the user a first prompt stored on a first ancillary partition of the one or more ancillary partitions, wherein a first portion of an authentication credential is stored on the first ancillary partition. The first prompt, as well as any of the other prompts described herein, may be generated from a user knowledge database, which may comprise various types of information about the user that has been gathered by the system. In this regard, the user information may be information within the personal knowledge of the user (e.g., information that is known to the user, and preferably known exclusively by the user). The prompts may take various different forms, such as a text prompt, audio-based prompt, image-based prompt, and/or the like.

In an exemplary embodiment, the user knowledge database may include a transaction history associated with a user account (e.g., an account with a financial institution). Accordingly, in one embodiment, the first prompt may be a text-based prompt or question such as "select which of the following transactions you have made in the past 7 days." Accordingly, the text-based prompt may be presented on a graphical interface of the computing device that the user is trying to access (e.g., on a display device of the computing device, such as a screen). The text-based prompt may further comprise one or more options that the user may select (e.g., by interacting with the options on the graphical interface). Continuing the example, the user may select the options that correspond to the transactions that the user has made based on the user's personal knowledge of the user's transaction history. If the user provides the correct responses to the first prompt, the system may decrypt the first portion of the authentication credential (e.g., using a first decryption key). The system may then provide the user with a second prompt from a second ancillary partition, as described below. If the user fails to provide the correct responses to the first prompt, the first ancillary partition may remain locked. Further, in some embodiments, upon detecting that the user has provided an incorrect response to the first prompt, the system may present a different prompt (e.g., select a different prompt stored on the first ancillary partition) that may also be based on the user knowledge database.

In some embodiments, the prompt that may be presented to the user may be dynamically selected such that a different prompt is presented to the user each time that a user attempts to access an ancillary partition (e.g., the first ancillary partition). In this regard, the first ancillary partition (and/or other ancillary partitions as described herein) may store multiple different prompts, where such prompts may be updated on an ongoing, periodic basis (e.g., every day, every week, every hour, and/or the like). In this way, the system may increase the security of the access recovery process.

Next, as shown in block 308, the method includes, based on receiving a response to the first prompt, presenting to the user a second prompt stored on a second ancillary partition of the one or more ancillary partitions, wherein a second portion of the authentication credential is stored on the second ancillary partition. The second prompt may be another text-based prompt, or may in other embodiments be a different type of prompt from the first prompt. For example, the second prompt may be an audio-based prompt in which a verbal prompt or question is played through an audio output device of the computing device (e.g., a speaker). The prompt may be, for instance, a voice message such as "provide your residential street address for year 20XX." The graphical interface of the computing device may display one or more interface elements for the user to enter the response to the audio prompt (e.g., via an on-screen keypad). In other embodiments, the user may provide the response through other input methods (e.g., a voice sample, mouse input, keyboard input, and/or the like). In yet other embodiments, the second prompt may include a text prompt to provide unique characteristic data (e.g., please provide a fingerprint scan). Upon receiving a correct response to the second prompt, the system may decrypt the second portion of the authentication credential (e.g., using a second decryption key).

Next, as shown in block 310, the method includes authenticating the user based on the response to the first prompt and a response to the second prompt, wherein authenticating the user comprises generating a reconstituted authentication credential based on the first portion and the second portion; and unlocking the primary partition using the reconstituted authentication credential. In particular, the reconstituted authentication credential may be generated by combining the first portion of the authentication credential and the second portion of the authentication credential (along with any other portions that may be stored on other ancillary partitions). In some embodiments, the system may require not only that the threshold number of ancillary partitions are unlocked, but also may require that specific ancillary partitions are unlocked in a specific order. In such embodiments, reconstituting the authentication credential may comprise appending the second portion of the authentication credential to the end of the first portion of the authentication credential. In some embodiments, the reconstituted authentication credential may be automatically transmitted to the computing device. In this regard, in embodiments in which the authentication credential is a password, the reconstituted authentication credential may be entered into the password entry field of the user interface of the computing device.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for secure cross partition access and computing device recovery, the system comprising:

a processing device;

a non-transitory storage device containing instructions when executed by the processing device, causes the processing device to perform the steps of:

detecting an unsuccessful attempt by a user to access a primary partition of a computing device, wherein the computing device comprises one or more ancillary partitions;

receiving a request from the user to initiate a recovery process for the computing device;

based on receiving the request, presenting to the user a first prompt stored on a first ancillary partition of the one or more ancillary partitions, wherein a first portion of an authentication credential is stored on the first ancillary partition at an edge device, wherein the first prompt is generated using artificial intelligence based machine learning model comprising an artificial neural network, wherein the first prompt is dynamically reconfigured such that the first prompt is randomized based on hourly updates;

based on receiving a response to the first prompt, presenting to the user a second prompt stored on a second ancillary partition at a second edge device, wherein a second portion of the authentication credential is stored on the second ancillary partition, wherein the second prompt is generated using the artificial intelligence based machine learning model comprising the artificial neural network, wherein the second prompt comprises a text prompt displayed on a display device to provide unique characteristic data;

generating a complete reconstituted authentication credential by unlocking the first ancillary partition and decrypting the first portion of the authentication credential using a first decryption key and unlocking the second ancillary partition and decrypting the second portion of the authentication credential using a second decryption key;

authenticating the user using the complete reconstituted authentication credentials based on the response to the first prompt and a response to the second prompt at the edge device and the second edge device; and unlocking the primary partition at a computing device using the complete reconstituted authentication credential.

2. The system of claim 1, wherein the first portion of the authentication credential is encrypted using a different encryption algorithm from the second portion of the authentication credential.

3. The system of claim 1, wherein the authentication credential comprises a username and password.

4. The system of claim 1, wherein the first prompt and the second prompt are selected from one or more prompts generated from a user knowledge database, wherein the user knowledge database comprises information regarding the user.

5. The system of claim 4, wherein the prompts are generated using a natural language generation ("NLG") algorithm based on the information regarding the user.

6. A computer program product for secure cross partition access and computing device recovery, the computer program product comprising a non-transitory computer-readable medium comprising code causing an apparatus to perform the steps of:

detecting an unsuccessful attempt by a user to access a primary partition of a computing device, wherein the computing device comprises one or more ancillary partitions;

receiving a request from the user to initiate a recovery process for the computing device;

based on receiving the request, presenting to the user a first prompt stored on a first ancillary partition of the one or more ancillary partitions, wherein a first portion of an authentication credential is stored on the first ancillary partition at an edge device, wherein the first prompt is generated using artificial intelligence based machine learning model comprising an artificial neural network, wherein the first prompt is dynamically reconfigured such that the first prompt is randomized based on hourly updates;

based on receiving a response to the first prompt, presenting to the user a second prompt stored on a second ancillary partition at a second edge device, wherein a second portion of the authentication credential is stored on the second ancillary partition, wherein the second prompt is generated using the artificial intelligence based machine learning model comprising the artificial neural network, wherein the second prompt comprises a text prompt displayed on a display device to provide unique characteristic data;

generating a complete reconstituted authentication credential by unlocking the first ancillary partition and decrypting the first portion of the authentication credential using a first decryption key and unlocking the second ancillary partition and decrypting the second portion of the authentication credential using a second decryption key;

authenticating the user using the complete reconstituted authentication credentials based on the response to the first prompt and a response to the second prompt at the edge device and the second edge device; and unlocking the primary partition at a computing device using the complete reconstituted authentication credential.

7. The computer program product of claim 6, wherein the first portion of the authentication credential is encrypted using a different encryption algorithm from the second portion of the authentication credential.

8. The computer program product of claim 6, wherein the first prompt and the second prompt are selected from one or more prompts generated from a user knowledge database, wherein the user knowledge database comprises information regarding the user.

9. The computer program product of claim 8, wherein the prompts are generated using a natural language generation ("NLG") algorithm based on the information regarding the user.

10. A computer-implemented method for secure cross partition access and computing device recovery, the computer-implemented method comprising:

detecting an unsuccessful attempt by a user to access a primary partition of a computing device, wherein the computing device comprises one or more ancillary partitions;

receiving a request from the user to initiate a recovery process for the computing device;

based on receiving the request, presenting to the user a first prompt stored on a first ancillary partition of the one or more ancillary partitions, wherein a first portion of an authentication credential is stored on the first ancillary partition at an edge device, wherein the first prompt is generated using artificial intelligence based machine learning model comprising an artificial neural network, wherein the first prompt is dynamically reconfigured such that the first prompt is randomized based on hourly updates;

based on receiving a response to the first prompt, presenting to the user a second prompt stored on a second ancillary partition at a second edge device, wherein a second portion of the authentication credential is stored on the second ancillary partition, wherein the second prompt is generated using the artificial intelligence based machine learning model comprising the artificial neural network, wherein the second prompt comprises a text prompt displayed on a display device to provide unique characteristic data;

generating a complete reconstituted authentication credential by unlocking the first ancillary partition and decrypting the first portion of the authentication credential using a first decryption key and unlocking the second ancillary partition and decrypting the second portion of the authentication credential using a second decryption key;

authenticating the user using the complete reconstituted authentication credentials based on the response to the first prompt and a response to the second prompt at the edge device and the second edge device; and unlocking the primary partition at a computing device using the complete reconstituted authentication credential.

11. The computer-implemented method of claim 10, wherein the first portion of the authentication credential is encrypted using a different encryption algorithm from the second portion of the authentication credential.

12. The computer-implemented method of claim 10, wherein the authentication credential comprises a username and password.

13. The computer-implemented method of claim 10, wherein the first prompt and the second prompt are selected from one or more prompts generated from a user knowledge database, wherein the user knowledge database comprises information regarding the user.

14. The computer-implemented method of claim 13, wherein the prompts are generated using a natural language generation ("NLG") algorithm based on the information regarding the user.

* * * * *